United States Patent [19]

Shimizu

[11] Patent Number: 4,464,765
[45] Date of Patent: Aug. 7, 1984

[54] BURST SIGNAL TRANSMISSION SYSTEM
[75] Inventor: Hiroshi Shimizu, Tokyo, Japan
[73] Assignee: Nippon Electric Co., Ltd., Tokyo, Japan
[21] Appl. No.: 368,235
[22] Filed: Apr. 13, 1982
[30] Foreign Application Priority Data Apr. 15, 1981 [JP] Japan .................................. 56-55531

[51] Int. Cl.³ ........................................... H04L 25/34
[52] U.S. Cl. ....................................... 375/17; 371/56; 375/36
[58] Field of Search ............................ 371/40, 45, 56; 178/69 D; 375/17, 19, 25, 34, 58; 455/64, 65, 63; 370/24, 29, 32; 375/36

[56] References Cited
U.S. PATENT DOCUMENTS

| 2,700,696 | 1/1955 | Barker ................................... 375/19 |
| 3,571,794 | 3/1971 | Tong ..................................... 371/40 |
| 3,695,294 | 6/1976 | Renz et al. ............................ 375/34 |
| 3,783,383 | 1/1974 | Forster ................................. 371/56 |
| 4,003,041 | 1/1977 | Duuren et al. ....................... 375/19 |

OTHER PUBLICATIONS

IEEE Transactions on Communications, vol. COM-29, No. 11, Nov. 1981, pp. 1565-1572.
IEEE Transactions on Communications, vol. COM-27, No. 7, Jul. 1979, pp. 1096-1103.

Primary Examiner—Benedict V. Safourek
Attorney, Agent, or Firm—Sughrue, Mion, Zinn, Macpeak & Seas

[57] ABSTRACT

In a multi-level transmission system, a binary digital signal is converted into a multi-level signal by generating successive multi-level symbols each having a polarity opposite the polarity of the average DC level of preceding symbols, with the first symbol having a first polarity when the first binary bit is a logical "0" and having a second polarity when the first bit is a logical "1". If desired, the logical values of all bits after the first bit can be complemented prior to generating the appropriate multi-level symbols.

17 Claims, 18 Drawing Figures

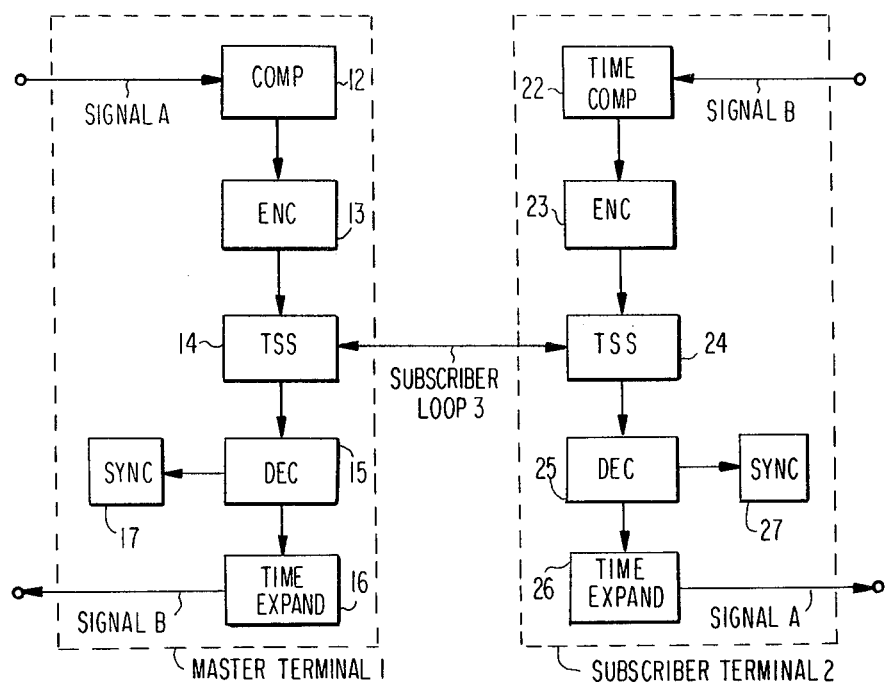
FIG. 1
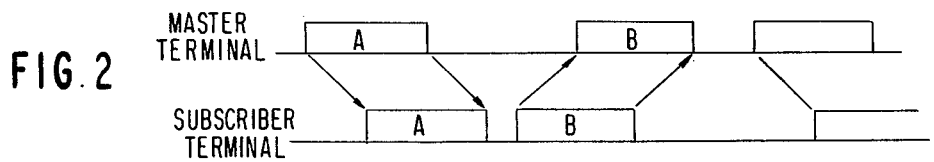
FIG. 2
FIG. 3
| BINARY CODE | 7 LEVEL CODE |
|---|---|
| 0 0 | 0 |
| 0 1 | ±1 |
| 1 0 | ±2 |
| 1 1 | ±3 |

(a₁)

(b₁)

(c₁)

(a₂)

(b₂)

(c₂)

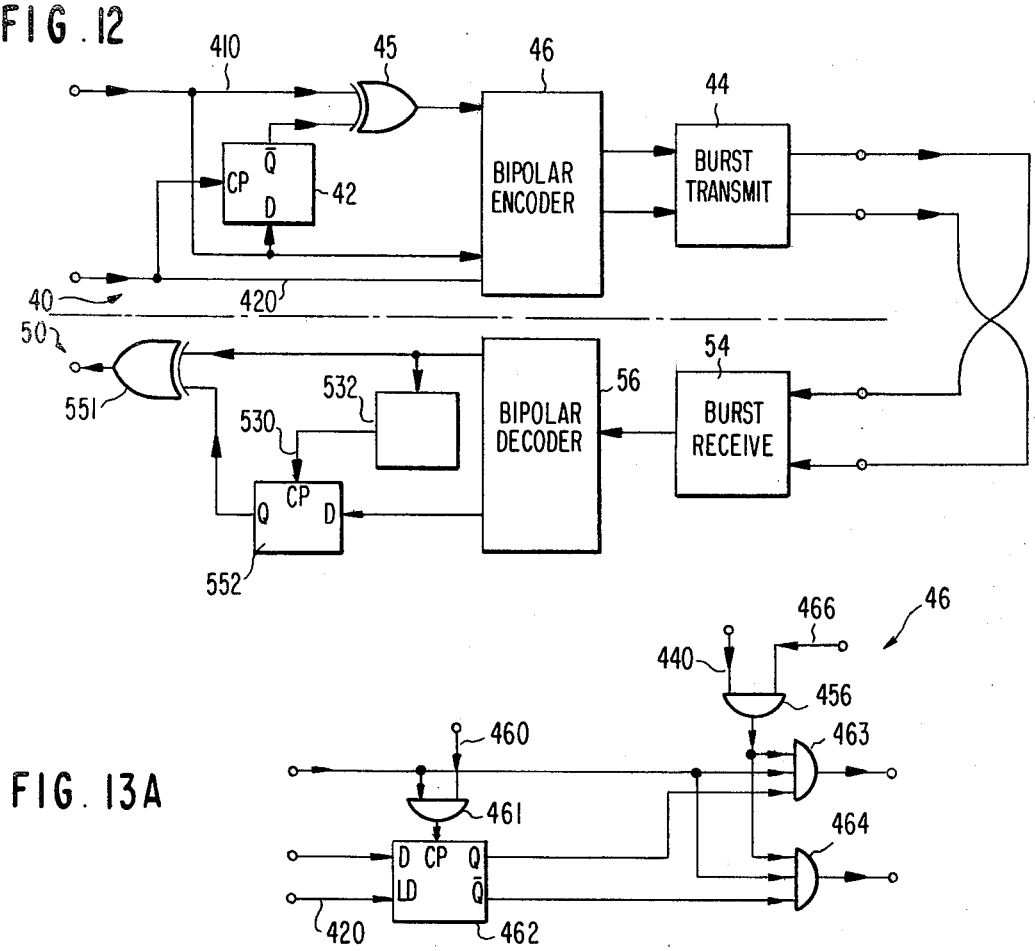
FIG.12
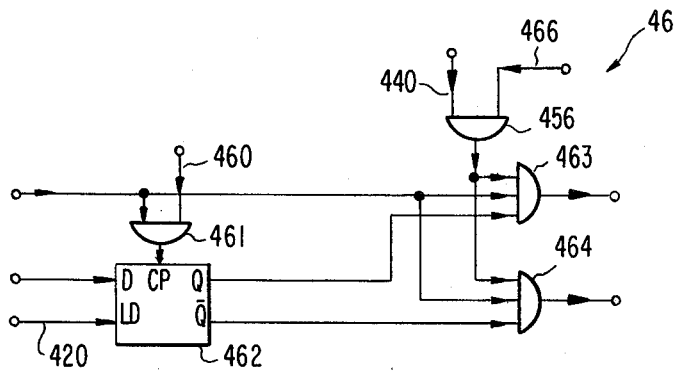
FIG.13A
FIG.13B
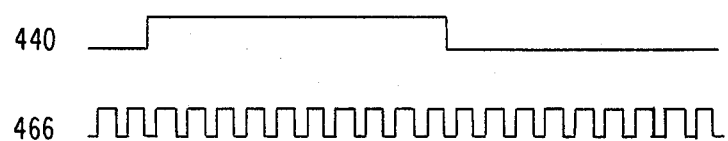
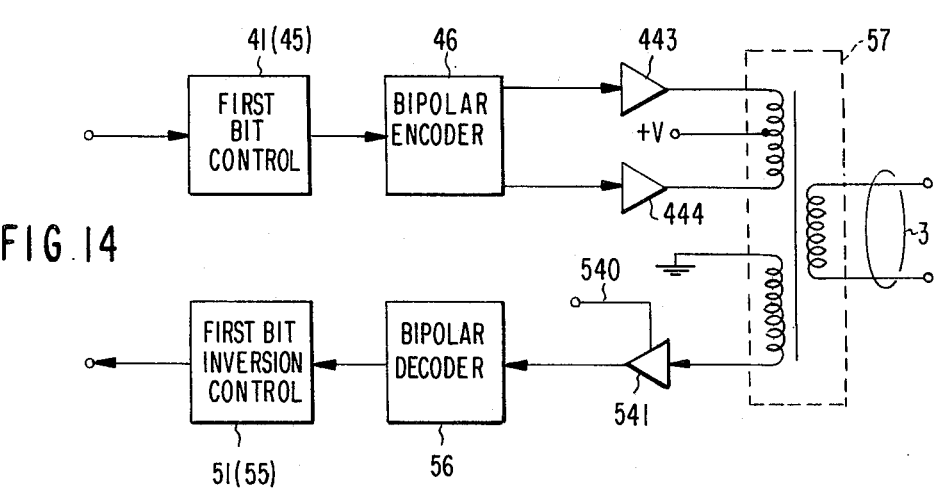
FIG.14

BURST SIGNAL TRANSMISSION SYSTEM

BACKGROUND OF THE INVENTION

The present invention relates to a burst signal transmission system and, more particularly, to a method and apparatus for the transmission of burst signals between two remote communication terminals.

Ever increasing tendency to the digitizing of communication systems has already resulted in wide use of digital switching systems. To further enhance the efficiency of digital communication system or to promote advanced new services such as integrated speed-data communication, it is a primary requisite to set up thorough digitization down to local subscribers by digitalizing the subscriber loop transmission. Various systems have hitherto been studied and developed for bidirectional digital transmission using an existing pair of subscriber cables. In terms of simplicity in construction, the most hopeful system is a burst signal transmission system of the type which separates a transmission period from a switching network to a subscriber and a transmission period from the subscriber to the switching network from each other and allows bidirectional transmission to occur within a predetermined burst period.

The burst transmission system of such a type will be outlined with reference to FIGS. 1 and 2. In FIG. 1, a master terminal 1 includes a time compressor 12 adapted to compress a signal A to be transmitted into a burst form. An encoder 13 transforms the compressed signal into a line code which is then supplied in a burst mode to a subscriber loop 3 via a time separation switch 14. A subscriber terminal 2, on the other hand, includes a decoder 25 supplied with the input digital signal A through a time separation switch 24. The decoder 25 processes the signal A in burst form into a binary code. A time expander 26 reconstructs the original form of signal from the burst form signal A, or burst A as it will be referred to hereinafter. A synchronization circuit 27 extracts a burst synchronization signal from the burst A to hold burst synchronization. Meanwhile, a signal B to be fed from subscriber terminal 2 to the master terminal 1 is converted into a burst form line code through a time compressor 22 and an encoder 23 and then coupled to the switch 24. After the reception of the burst A, the switch 24 couples the burst form line code B, or burst B as it will be called hereinafter, to the subscriber loop 3. The burst B received by the terminal 1 via the switch 14 is processed by the time expander 16 into the original signal B. A synchronization circuit 17 extracts a burst synchronization signal from the received burst B. Such an exchange of bursts occurs within a predetermined burst repetition period, as shown in FIG. 2. Each burst has to occupy a time period shorter than one half the burst repetition period; the shorter the time period occupied by a burst, the longer the bidirectional transmission distance can be extended.

An example of this conventional burst transmission system is described in "A Digital Subscriber Set" by Jan Meyer at al., IEEE TRANSACTIONS ON COMMUNICATIONS, Vol. COM-27, No. 7, pp. 1096-1103, July issue, 1979 (Reference 1). According to this example, a burst has a synchronization bit SY in its first bit in addition to speech data-samples, a signalling bit and other information bits and is transmitted using bipolar codes. However, the additional synchronization bit causes an increase in the burst length, i.e., the time period occupied by a burst, and, therefore, a decrease in the maximum possible distance of transmission. The situation remains the same even though multi-level codes may be used as the line codes, requiring an increase in the number of symbols in a burst signal.

Another form of burst transmission is proposed in the U.S. Pat. No. 3,974,339 (Reference 2). This proposed system performs the following operation without using such a burst synchronization bit. More clearly, a transmitting end converts a digital signal into line codes having a positive pulse corresponding to a logical "1" of the digital signal and a negative pulse corresponding to a logical "0" of the same, while a receiving end detects a non-zero pulse initially appearing in the burst. A problem has still existed in this type of burst transmission in that, if the difference in number between positive pulses and negative pulses in a burst is significant, the average DC (direct current) level of the burst differs a great deal from the zero level, resulting in a substantial waveform distortion in a subscriber loop having low frequency cutoff characteristics. Such a waveform distortion makes signal regeneration at the transmitting end difficult.

SUMMARY OF THE INVENTION

It is one object of the present invention to provide a method and apparatus for the transmission of a burst signal which allows a minimum of DC imbalance in a burst signal without employing any additional synchronization bit.

In one aspect of the present invention, there is provided a method of transmitting a digital signal in a burst mode using multi-level codes prepared by converting the digital signal into absolute values of a plurality of multi-level symbols and transmitted selectively as a symbol of a first polarity, a symbol of a second polarity opposite to the first polarity, and a zero level symbol. This method comprises the following steps:

at a transmitting end, when the first bit of a digital signal processed into a block for transmission in correspondence with a burst is a logical "1", the first symbol of the transmit burst signal is converted into a multi-level code provided with a first polarity while, when the first bit of the digital signal is logical "0", the logical "0" of the first bit is inverted into local "1" and the first symbol of the burst signal is converted into a multi-level code provided with a second polarity, and each of the second symbol and its subsequent symbols is converted into a multi-level code provided with a polarity which is opposite to that of the average DC level before said each symbol or, if said average DC level is zero, opposite to that of the immediately preceding symbol except a zero level symbol; and extracted from the first symbol of the burst signal, the absolute value of each of the symbols is converted into a digital signal, and the first bit of the digital signal is decoded into logical "1" when the first symbol is of the first polarity, and into logical "0" when the first symbol is of the second polarity.

According to another aspect of the present invention, there is provided a burst signal a transmission apparatus for multi-level transmission of a digital signal in a burst mode using symbols of a first and second opposite polarities and a zero level symbol. This apparatus comprises: a transmitter made up of a first bit detector for detecting the first bit of a digital signal processed into a block for transmission corresponding to a burst; a first bit control circuit for making the first bit logical "1"; a multi-level encoder for converting into absolute values of a plurality of multi-level symbols the digital signal whose first bit is kept in logical "1" by the first bit control circuit, said multi-level encoder being constructed to select the first polarity for the first symbol of the polarity of multi-level symbols when the output of the first bit detector is a logical "1," to select the second polarity for the first symbol when the output of the first bit detector is logical "0," and to select a polarity for each of the second symbol and its subsequent symbols which is opposite to that of the average DC level before said symbol or, if the average DC level is zero, opposite to the immediately preceding symbol except a zero level symbol; and a burst transmitting circuit for transmitting the output of the multi-level encoder, and a receiver made up of a burst receiving circuit for receiving a burst signal; a first symbol extractor for extracting the polarity of the first symbol and a burst synchronization signal; a multi-level decoder for converting the multi-level codes of the burst signal into a digital signal; and a first bit-inversion control circuit for making the first bit of the digital signal logical "1" when the first symbol extracted by the first symbol extractor is of the first polarity but logical "0" when the first symbol is of the second polarity.

Another burst signal transmission apparatus of the present invention for multi-level transmission of a digital signal in a burst mode using symbols of first and second opposite polarities and a zero level symbol, comprises: a transmitter made up of a first bit detector for detecting the first bit of a digital signal processed into a block for transmission corresponding to a burst; a digital signal control circuit for leaving the digital signal unchanged when the first bit detected by the first bit detector is logical "1" and inverting all the logical values of the digital signal when the first bit is logical "0"; a multi-level encoder for converting the output of the digital signal control circuit into absolute values of a plurality of multi-level symbols, said multi-level encoder being constructed to select the first polarity for the first symbol of the plurality of multi-level symbols when the output of the first bit detector is logical "1," to select the second polarity for the first symbol when the output of the first bit detector is logical "0," and to select a polarity for each of the second symbol and its subsequent symbols which is opposite to that of the average DC level before said symbol or, if the average DC level is zero, opposite to the immediately preceding symbol except a zero level symbol; and a burst signal transmitting circuit for transmitting the output of the multi-level encoder, and a receiver made up of a burst receiving circuit for receiving a burst signal; a first symbol extractor for extracting the polarity of the first symbol and a burst synchronization signal; a multi-level decoder for converting the multi-level codes of the burst signal into a digital signal; and a digital signal-inversion control circuit for leaving the digital signal unchanged when the first symbol detected by the first symbol detector is of the first polarity but inverting the digital signal when the first symbol is of the second polarity.

BRIEF DESCRIPTION OF THE DRAWINGS

The present invention will be described in detail with reference to the accompanying drawings, in which:

FIGS. 1 and 2 are diagrams showing a prior art burst transmission system disclosed in Reference 1;

FIG. 3 is a table showing a relationship between binary codes and 7-level symbols;

FIGS. 11 and 12 are diagrams showing a fourth embodiment; and

FIGS. 13A and 13B and 14 are diagrams showing alternatives to the embodiments.

In the drawings, identical reference numerals denote identical structural elements or identical signals. Digital signals appearing on signals lines throughout the drawings are commonly processed in a serial manner.

DETAILED DESCRIPTION OF THE INVENTION

The present invention is concerned with a coding process for a burst transmission system and, therefore, the following description will concentrate on transmission in one direction only. Also, in this description, there is in most cases no distinction made between said signals and signal lines. The present invention will first be described in connection with the use of multi-level codes and, in the particular example used 2-bit binary codes correspond to 7-level symbols. A relationship between the binary codes and the 7-level codes is tabulated in FIG. 3. It will be seen from FIG. 3 that the binary codes correspond only with the absolute values of the 7-level codes.

Description will be made to FIG. 4 for describing a coding and decoding method according to the present invention. A waveform ($a_1$) in FIG. 4 indicates digital signal block prepared at a transmitter to have a stream of ten bits correspondencing to a burst signal, the signal levels of the ten bit stream being "1000011101". Since the first bit is (logical) "1" the digital signal is multi-level coded by each two successive bits according to the table of FIG. 3 to obtain absolute values "2", "0", "1", "3", "1". The first bit of the digital signal is "1" and, therefore, the first symbol is provided with a positive polarity to become "+2". The next symbol is "0", and, thus, provided with "0" level. The third symbol is provided with a negative polarity since the sum of the first and second symbols, i.e., the average DC level up to the second symbol is positive. This makes the third symbol "−1". With the same principle, the fourth symbol is "−3" because the averge DC level up to the third symbol is positive, and the fifth symbol is "+1" because the average DC level up to the fourth symbol is negative. The resulting 7-level, 5-symbol burst signal is indicated by a waveform ($c_1$) in FIG. 4.

Figure 4:
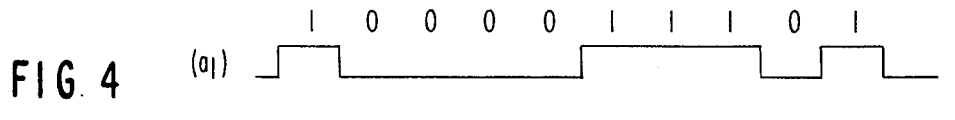
FIGS. 4 and 5A and 5B are diagrams showing a first embodiment of the present invention.
Figure 4:
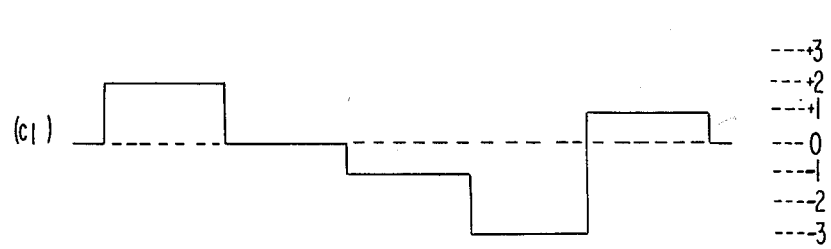
Figure 4:
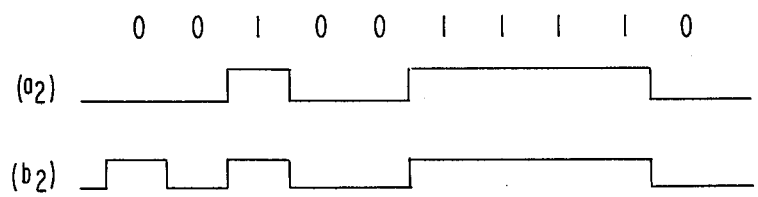
Figure 4:
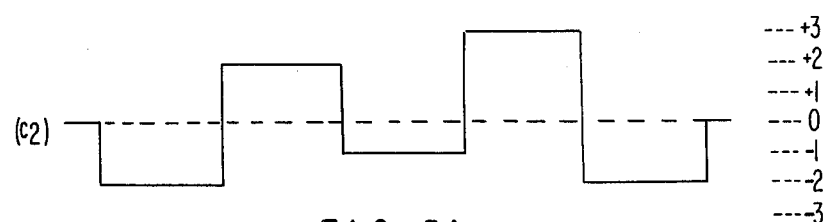

Meanwhile, a waveform ($a_2$) in FIG. 4 represents a digital signal block having a ten bit stream "0010011110". Led by the logical "0" first bit, this digital signal is processed to have a "1" level at the first bit only and the same or unchanged levels at the other bits, whereupon the signal is multi-level coded according to the table of FIG. 3. The resultant multi-level signal has absolute values "2", "2", "1", "3", "2". Of these symbols, the first symbol is provided with a negative polarity to be "−2" since the first bit of the digital signal ($a_2$) is "0". Accordingly, the second symbol is provided with a positive polarity and becomes "+2". The average DC level up to the second symbol is thus zero, so that the third symbol obtains a polarity opposite to that of the immediately preceding symbol of a level other than "0," i.e., the second symbol, thereby becoming a "1". Since the average DC level up to the third symbol, which is "−1", is negative, the fourth symbol is "+3". In the same manner, the fifth symbol is "−2" because the average DC level up to the fourth symbol is positive. The resultant burst signal is indicated by a waveform ($c_2$) in FIG. 4.

A receiver receives and rectifies the burst signal ($c_1$) or ($c_2$) shown in FIG. 4. The rectified burst signal will always be positive at its first symbol, permitting extraction of a burst synchronization signal. Converting the rectified burst signal into binary codes reconstructs a signal waveform ($b_1$) or ($b_2$) in FIG. 4. Using the extracted burst synchronization signal, the polarity of the first symbol of the burst signal ($c_1$) or ($c_2$) is identified; if the first symbol is positive as in the waveform ($c_1$), the binary codes after the conversion are unchanged while, if it is negative, only the first bit of the binary codes is inverted to "0" with other bits left unchanged. As a result, the burst signal ($c_1$) or ($c_2$) is decoded into the corresponding digital signal ($a_1$) or ($a_2$).

Figure 5A:
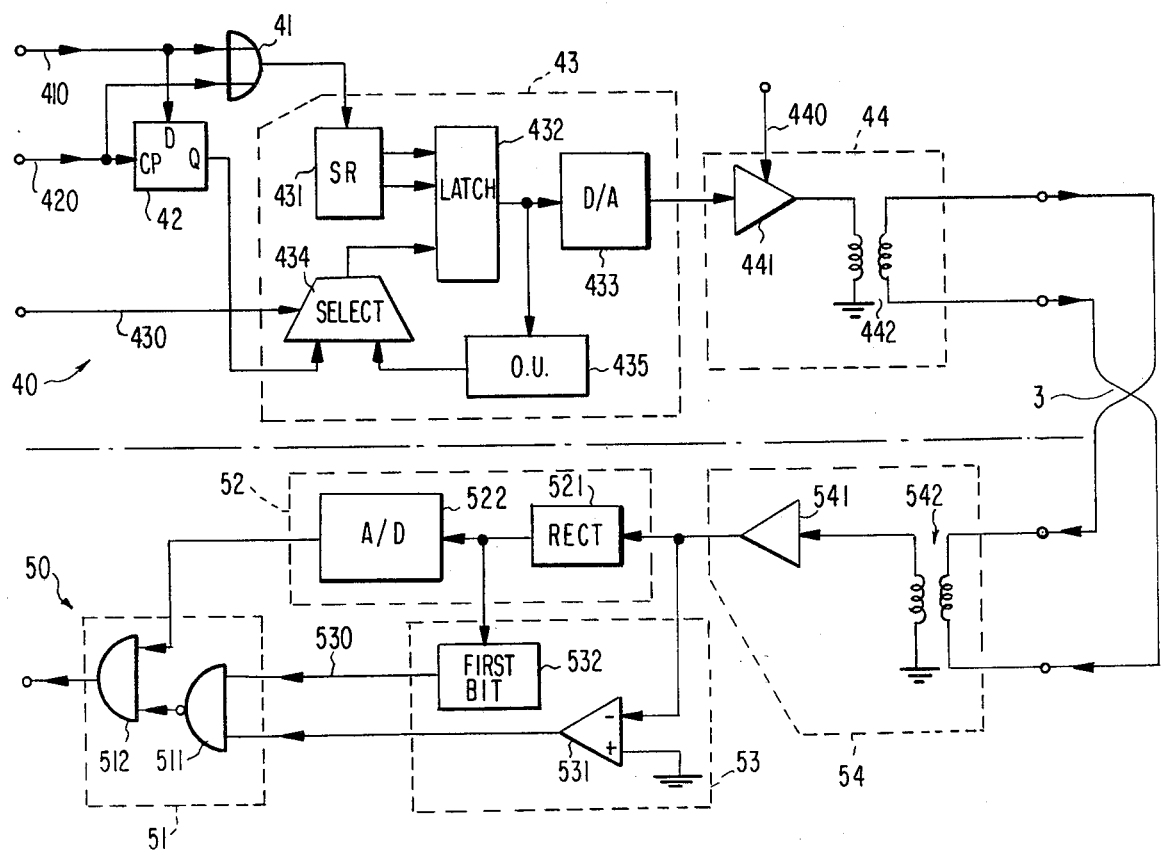
Figure 5B:
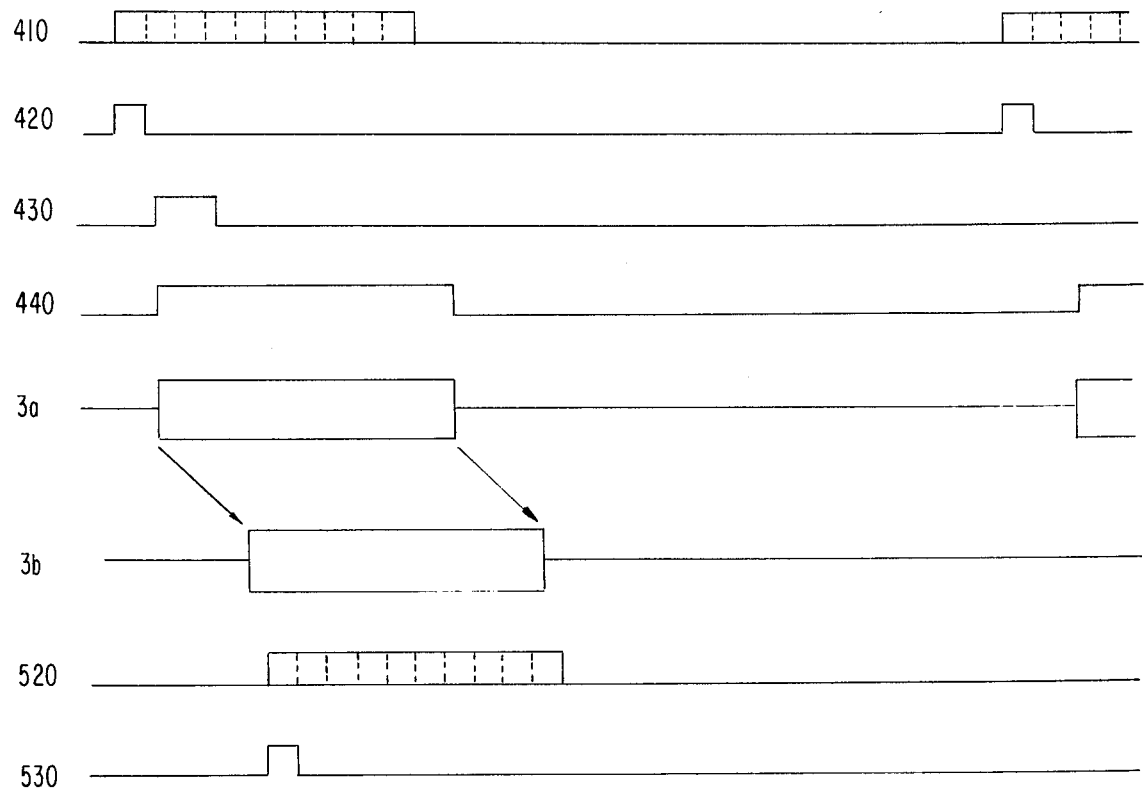

FIGS. 5A and 5B show a first embodiment of a transmission apparatus for practicing the coding and decoding discussed above.

A time compressed digital signal block having ten bits 410 (FIG. 5B) is supplied to an OR gate 41 and a flip-flop 42 of a transmitter 40. The flip-flop 42 latches the first bit of the digital input in response to a high level signal 420, which indicates the timing of the first bit. The OR gate 41 passes the digital input, so that the first bit is always kept at "1". Thus, the flip-flop 42 functions as a first bit detector and the OR gate 41 as a first bit control. The outputs of the OR gate 41 and flip-flop 42 are coupled to a multi-level encoder 43. In the multi-level encoder 43, a shift register 431 and a latch circuit 432 supply a digital-to-analog (D/A) converter 433 with the output of the OR gate 41 two bits at a time. A data selector 434, in response to a control signal 430 (FIG. 5B), selects the Q output of the flip-flop 42 and supplies it to the circuit 432 only when the leading two bits of the output of the OR gate 41 are being produced from the shift register 431. The D/A converter 433 therefore produces the multi-level first symbol having a magnitude corresponding to the output of the register 431 and a polarity provided by the Q output of the flip-flop 42. An operational unit 435 accumulates the output of the latch circuit 432 and supplies the selector 434 with a binary code whose polarity is opposite to that of the accumulated value. After the delivery of the first symbol, the selector 434 selects the output of the unit 435. Accordingly, from the second symbol onward, the polarities are determined such that the average DC level has a smaller absolute value. When the average DC level is zero, the operational unit 435 supplies the selector 434 with a binary code opposite in polarity to the most recent symbol which was not a zero level symbol. The output (3a in FIG. 5B) of the multi-level encoder 43 is sent to a two-wire subscriber loop 3 through a transmission amplifier 441 and a transformer 442, which in combination form a burst transmitting circuit 44. The transmission amplifier 441 is operated only for the time period of burst transmission by a control signal 440 (see FIG. 5B). The operational unit 435 clears the value accumulated therein after the burst transmission.

A receiver 50 includes a burst receiving circuit 54 made up of a reception amplifier 541 and a transformer 542. The receiver 50 is supplied with the multi-level burst signal (3b in FIG. 5B) via the subscriber loop 3. The output of the circuit 54 is given to a multi-level decoder 52 and a first symbol extractor 53. In the decoder 52, the burst signal is rectified by a rectifier 521 and transformer into binary codes two bits at a time by an analog-to-digital (A/D) converter 522. In the first symbol extractor 53, on the other hand, the polarity of each symbol of the burst signal ("1" for the negative polarity and "0" for the others) is produced from a comparator 531 while a burst synchronization signal 530 is extracted by a first bit detector 532 (see FIG. 5B). When the polarity of the symbol is negative, a first bit-inversion control circuit 51 causes its AND gate 511 to make its output level low for the duration of the first bit only, thereby inverting only the first bit of the output of the decoder 52 (520 in FIG. 5B) to regenerate the original form of signal.

Figure 6A:
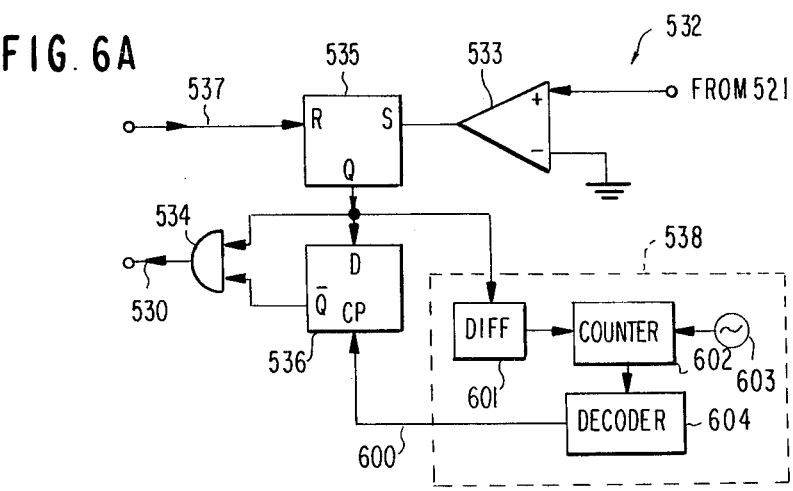
FIGS. 6A and 6B are diagrams showing a part of the first embodiment.
Figure 6B:
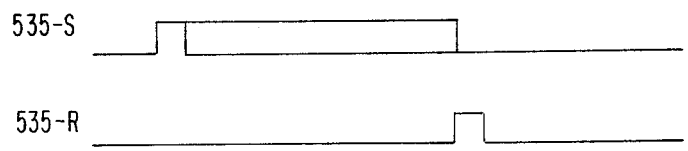

An example of the first bit detector 532 is illustrated in FIG. 6A. The output of the rectifier 521 shown in FIG. 6B is fed to the positive input terminal (+) of a comparator 533 which sets a flip-flop 535 at the leading edge of the first symbol which is not a zero level. The Q output of the flip-flop 535 is latched by a flip-flop 536 in response to a clock 600. An AND gate 534 extracts a clock pulse corresponding to the first bit based on the Q output of the flip-flop 535 and the Q output of the flip-flop 536 (inverted version of the latched data). The clock 600 is extracted in a clock synchronization circuit 538. The flip-flop 535 is reset by a control signal 537 shown in FIG. 6B after the reception of the burst signal so as to prepare for the next burst. The circuit 538 may be constructed in a known manner. For instance, it may comprise as illustrated a digital differentiator 601 for detecting the rise of the flip-flop 535; a counter 602 whose phase is locked by the output of the differentiator 601; a decoder 604 for dividing the frequency of the counter 602 output; and a local oscillator 603.

Figure 7:
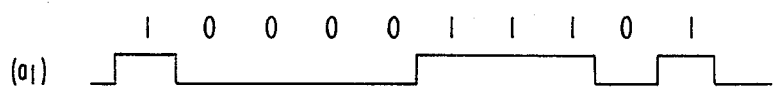
FIGS. 7 and 8 are diagrams showing a second embodiment.
Figure 7:
Figure 7:
Figure 7:
Figure 7:
Figure 7:
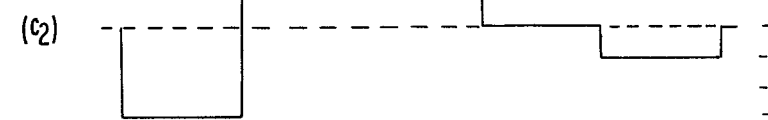

Referring to FIG. 7, another method which uses multi-level codes will be described hereunder. As long as the first bit of a digital signal to be transmitted is "1", the same procedure as the previously discussed occurs as will be seen by comparing waveforms ($a_1$), ($b_1$) and ($c_1$) shown in FIG. 7 with those of FIG. 4. Where the first bit is "0", a transmitter is designed to invert all the binary codes of the digital signal before multi-level coding and a receiver to transform the input multi-level codes into binary codes and then invert them to reconstruct the original signal, in contrast to the case shown in FIG. 4 wherein only the first bit was inverted to "1". The digital signal ($a_2$) in FIG. 7 is inverted to have a waveform ($b_2$) which is then coded to have multiple levels and transmitted to the receiver. The rules for coding the signal ($b_2$) to the signal ($c_2$) are exactly the same as those shown in FIG. 4. Again, the first symbol of the burst is always non-zero regardless of the logical level of the first bit of the transmit digital signal, permitting the receiver to extract a burst synchronization signal.

Figure 8:
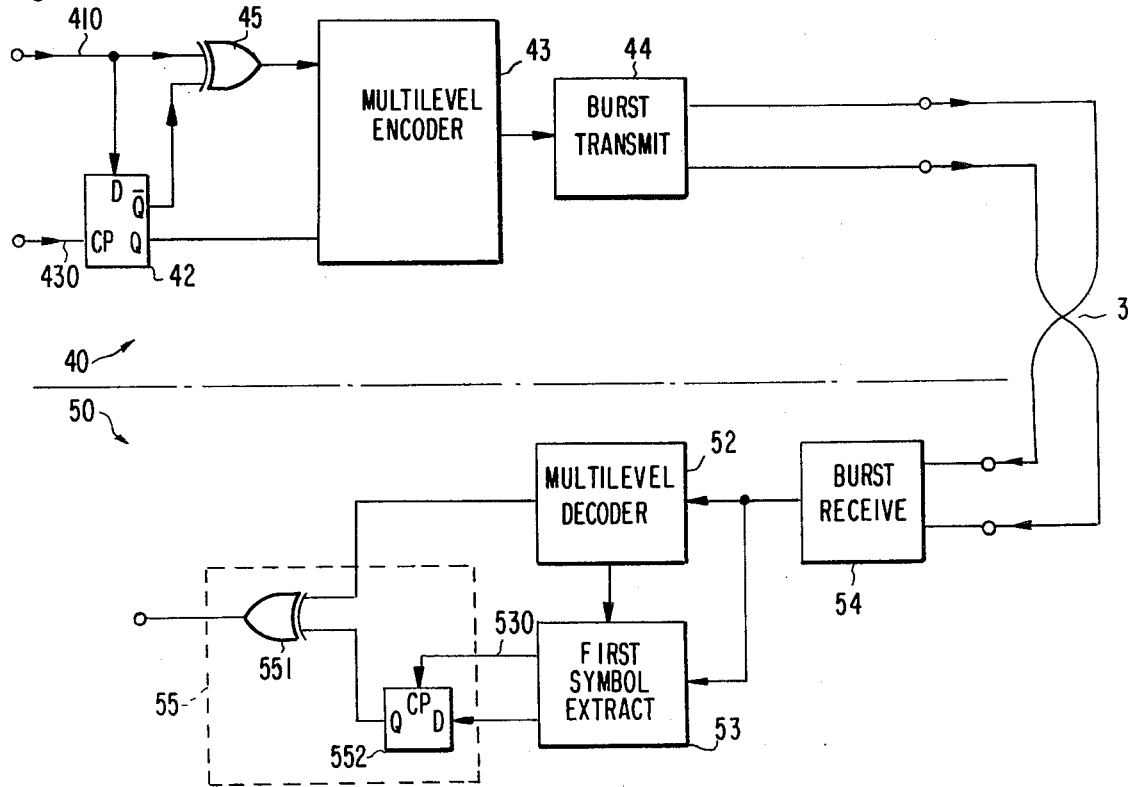

A second embodiment for practicing such a method is illustrated in FIG. 8. Referring to FIG. 8, the transmit digital signal 410 is supplied to an Exclusive OR (EOR) gate 45 of the transmitter 40 as well as to the D input of the flip-flop 42. The flip-flop 42 latches the first bit of the signal 410 and supplies the EOR gate 45 with its inverted output $\overline{Q}$. The EOR gate 45 therefore couples the signal 410 to the multi-level encoder 43 without inversion it if the first bit of the signal 410 is "1" but inverting every logical "0" and "1" of the signal 410 if the first bit is "0." The coder 43 receives the non-inverted output Q of the flip-flop 42 and processes it in the same way as in FIG. 5A. The output of the encoder 43 is fed to the subscriber loop 3 as a multi-level burst via the burst transmitting circuit 44. The EOR gate 45 in this case serves as a digital signal control circuit.

In the receiver 50, the multi-level burst is fed through the burst receiving circuit 54 to the multi-level decoder 52 and the first symbol extractor 53. The output of the decoder 52, the burst synchronization signal 530 extracted by the extractor 53 and the binary signal indicating a polarity of the received multi-level code ("1" when negative and "0" when otherwise) are all supplied to a digital signal-inversion control circuit 55. In this circuit 55, a flip-flop 552 holds the polarity of the first symbol for the duration of burst signal reception in response to the synchronization signal 530 and supplies it to an EOR gate 531. The EOR gate 551 reproduces the original signal by passing therethrough the output of the encoder 52 as it is if the polarity of the first symbol of the multi-level burst is positive, but inverting the logical "0" and "1" if the polarity is negative.

Figure 9:
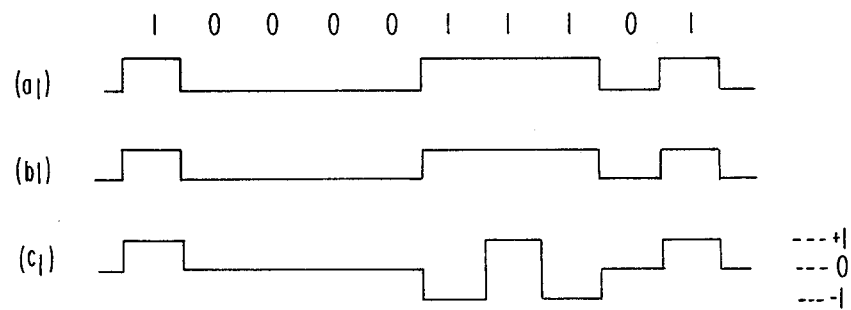
FIGS. 9 and 10A and 10B are diagrams showing a third embodiment.
Figure 9:
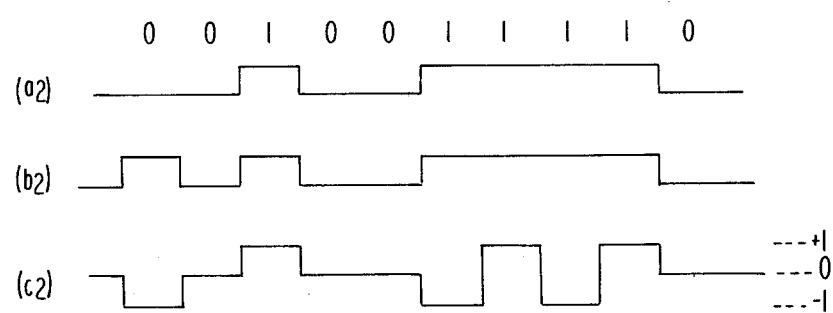

Next, description will be given on with regard to a case wherein use is made of multi-level codes comprising bipolar codes which are positive and negative pulses and a zero level. An exemplary method for transforming binary codes into bipolar codes and vice versa is illustrated in FIG. 9. Conversion of binary codes into bipolar codes can be performed very simply on the basis of the bipolar rule. Every time a binary logical "1" code appears, a pulse having the alternately inverted polarity is transmitted. For example, suppose a stream of binary codes "1000011101" led by the first bit of "1" as represented by a waveform (a$_1$) in FIG. 9. This binary bit stream is converted into a binary code stream (b$_1$) with no change due the "1" value of the first bit. Then, the binary code stream (b$_1$) is successively bipolarized into a waveform (c$_1$) in which the "1" of the first bit has been replaced by a positive pulse, "0" of the second to fifth bits have been replaced by zero levels, "1" of the sixth bit has been replaced by a negative pulse, "1" of the seventh bit by a positive pulse, and so on. For a string of codes led by "0" in the first bit as a waveform (a$_2$) in FIG. 9, it is transformed into a code string (b$_2$) in which only the first bit is made "1" with the others are unchanged. Then, as indicated by a waveform (c$_2$), a negative pulse is transmitted for the first "1" bit, a zero level for the "0" second bit, a positive pulse for the "1" third bit, and so on for each of the remaining bits. A receiver extracts the positive or negative pulse at the first bit of the burst signal as a burst synchronization signal, identifies the polarity of the first bit, and rectifies the burst signal. If the first bit is positive, no conversion is carried out after the rectification and before decoding. If the first bit is negative, the rectified digital signal is decoded having the first bit made "0" with the others unchanged. For example, the bipolar signal (c$_1$) or (c$_2$) in FIG. 9 which has reached a receiver will be decoded to obtain the digital signal (a$_1$) or (a$_2$).

Figure 10:
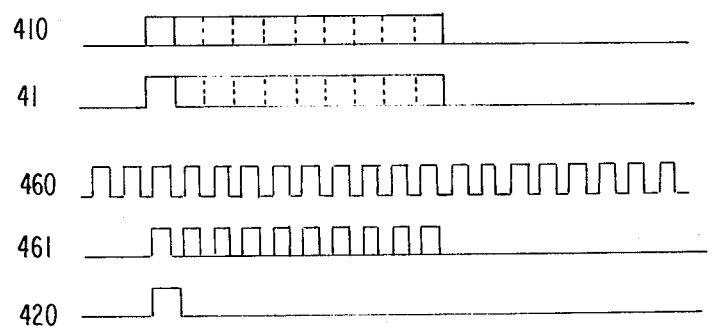
Figure 10A:
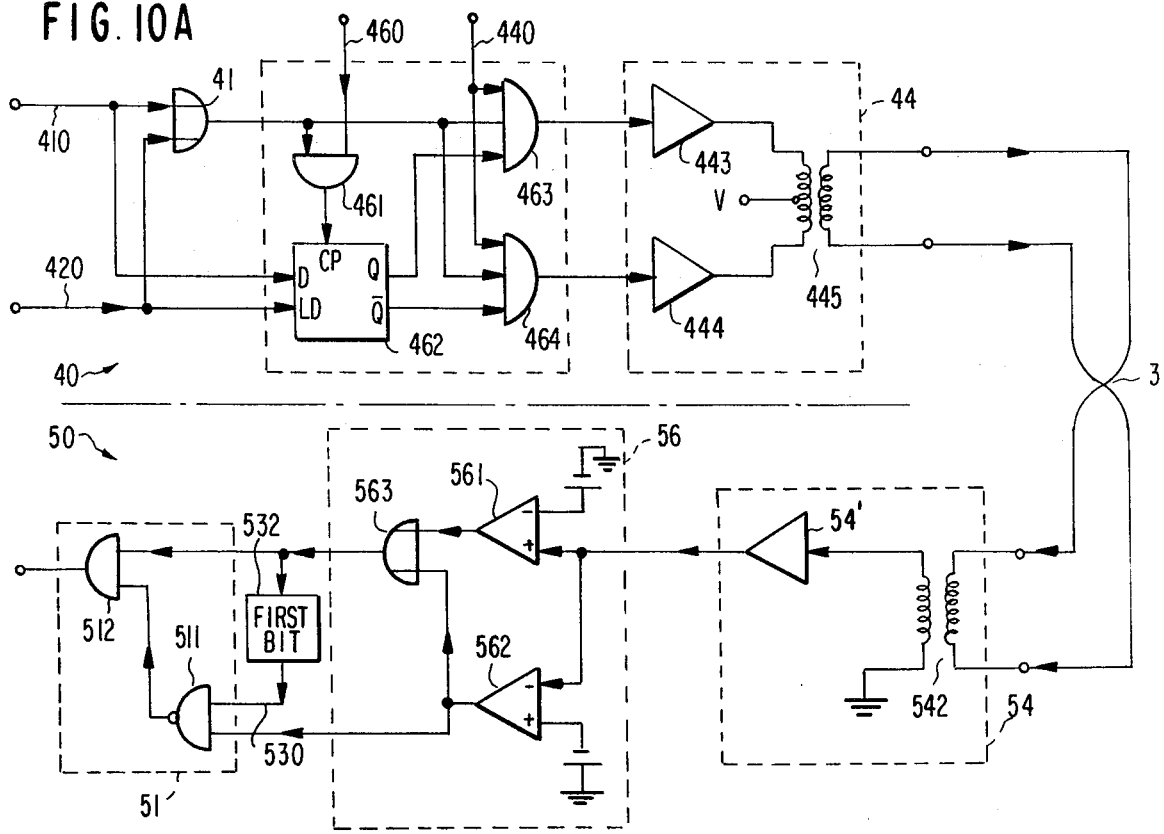

A third embodiment using such a method is depicted in FIG. 10A. The OR gate 41 of the transmitter 40 causes the transmit digital signal 410 to always be "1" (FIG. 10B) and couples it to a bipolar encoder 46. The encoder 46 includes a counter 462 which stores the first bit of the signal 410 in response to a control signal 420 supplied to its LD terminal and a clock input CP, which is the output of an AND gate 461. The output of the OR gate 41 is fed to AND gates 463 and 464 and to the AND gate 461. In response to a control signal 460 (FIG. 10B), the AND gate 461 performs RZ (return to zero) coding of the output of the OR gate 41 as indicated by a waveform 461 in FIG. 10B and supplies it to the clock input terminal CP of the counter 462. The counter 462 counts each "1" produced from the OR gate 41 starting from the first bit of the signal 410 while, at this instant, the control signal 420 remains "0" as indicated in FIG. 10B. If therefore the first bit of the digital signal 410 is "1", the non-inverted Q output and inverted $\bar{Q}$ output of the counter 462 are "1" and "0", respectively. In response to this first bit, the AND gate 463 is enabled and the AND gate 464 is diabled so that a driver 443 of the burst transmitting circuit 44 is enabled and a driver 444 of the same is disabled. A transformer 445 is connected at its opposite ends to the outputs of the drivers 443 and 444 and at its midpoint to a power supply, whereby a positive pulse is fed to the subscriber loop 3 in correspondence to the first bit. Where the first bit of the digital signal 410 is "0", the non-inverted Q output of the counter 462 is "0" and the inverted output is "1", disabling the gate 463 and enabling the gate 464. Then, a negative pulse is sent to the loop 3 in correspondence to the first bit. For the second bit and onward, the loop 3 remains at a zero level if the output of the OR gate 41 is "0" because, in such a condition, the outputs of the AND gates 463 and 464 are commonly "0". Also, the "0" output of the OR gate 41 renders the clock input CP to the counter 462 "0", thereby preventing the counter 462 from counting up. Upon appearance of a "1" in the output of the OR gate 41, the counter 462 counts it up and alternately supplies the AND gates 463 and 464 with "1". As a result, the loop 3 is alternatively supplied with a positive pulse and a negative pulse in correspondence with the "1" output of the OR gate 41. Supposing that the digital signal (a$_1$) or (a$_2$) in FIG. 9 has been given to the OR gate 41, the signal (b$_1$) or (b$_2$) appear at the output terminal of the OR gate 41 so that the signal (c$_1$) or (c$_2$) is fed to the loop 3. The counter 462 in FIG. 10A stores the first bit of the digital signal 410 to also function as a first bit detector. A control signal 440 is supplied to the AND gates 463 and 464 to activate the burst transmitting circuit 44 only for the time period of transmission.

In the receiver 50, the three-level burst signal is supplied through the burst receiving circuit 54 to a bipolar decoder 56. The decoder 56 includes a first comparator 561 which receives the burst signal at its positive (+) input and a positive reference voltage at its negative (−) input, and a second comparator 562 receiving the burst signal at its negative (−) input and a negative reference voltage at its positive (+) input. When the received burst signal is a positive pulse, the output of the comparator 561 is "1"; when the received burst signal is a negative pulse, the output of the comparator 562 is "1". The outputs of the comparators 561 and 562 are supplied to an OR gate 563. It will therefore be seen that the output of the OR gate 563 is a rectified version of the received burst signal. The first bit detector 532 extracts the burst synchronization signal and supplies it to the first bit-inversion control circuit 51. While the detector 532 may be identical with that shown in FIG. 6A, it is also permissible to couple the output of the OR gate 563 directly to the set input (S) of the flip-flop 535 with the comparator 533 omitted, because the output of the OR gate 563 is a binary code. As in the first embodiment shown in FIG. 5A, the circuit 51 produces the output of the bipolar decoder 56, i.e., the output of the OR gate 563, without any change when the first pulse of the received burst is positive, but changing the first bit of the decoder output into "0" with the others unchanged when the first pulse is negative.

Figure 11:
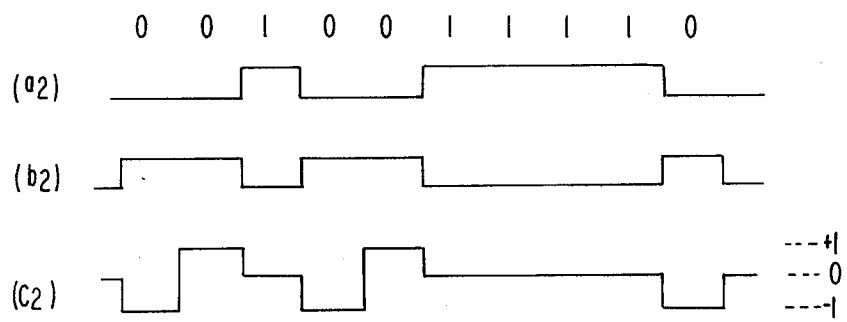

Another coding and decoding method using bipolar codes will be described with reference to FIG. 11. It should be noted that the procedure for the case where the first bit of a transmit digital signal is "1" is identical with that already discussed with reference to FIG. 9 and, therefore, will not be described any further. When the first bit of a transmit digital signal is "0" as in a waveform (a$_2$) in FIG. 11, a transmitter inverts all the "0" and "1" levels throughout the signal to form a waveform (b$_2$). The waveform b$_2$ is then bipolarized with the first bit replaced by a negative pulse, resulting in a bipolarized waveform (c$_2$). A receiver, on the otherhand, rectifies the received burst signal, extracts a burst synchronization signal from the non-zero first bit, and identifies the polarity of the first pulse of the burst signal. If the first pulse is positive, the rectified digital signal is produced without any change; if it is negative, the rectified signal is decoded after having all its "0" and "1" levels inverted.

A fourth embodiment of the invention employing the above-described coding and decoding method is illustrated in FIG. 12. The flip-flop 42 of the transmitter 40 latches the first bit of the transmit digital signal 410 and supplies its inverted output $\overline{Q}$ to the EOR gate 45. Accordingly, the EOR gate 45 couples its output to the bipolar encoder 46 without changing the input if the first bit of the signal 410 is "1", but inverting all the "0" and "1" levels if the first bit is logical "0". Thereafter, the same procedure as in the third embodiment of FIG. 10 takes place to feed the bipolarized output of the transmitter 40 to the subscriber loop 3. The receiver 50 decodes the bipolar code as in the third embodiment, extracts a burst synchronization signal 530, and identifies the polarity of the first pulse of the burst signal. The polarity detected is fed to the D input terminal of the flip-flop 552, latched by the signal 530 coupled to the clock terminal CP, and held for the duration of burst reception. The non-inverted output Q of the flip-flop 552 is coupled to the EOR gate 551 so that the EOR gate 551 passes the output of the decoder 56 therethrough as it is when the polarity of the first pulse of the burst signal is positive, while inverting the logical "0" and "1" if the first pulse is negative.

It will be seen from the foregoing that according to the present invention the first symbol of a burst signal is always non-zero which allows a burst synchronization signal to be extracted without resorting to any additional bit or symbol for burst synchronization. Since the polarity of each symbol is so determined as to reduce the DC imbalance of a burst signal, the imbalance can be limited to within a maximum absolute value of one symbol regardless of the bit pattern of a transmit digital signal or the number of multi-level symbols. Taking for example the bipolar transmission wherein the line clock is 256 KHz and the burst repetition period is 125 microseconds, the DC imbalance is 1/32 relative to the peak value "1" of a non-zero pulse even in the worst case. Deterioration in S/N (signal to noise) ratio attributable to such a DC imbalance is not more than −30 dB, which is negligible in transmission.

While the present invention has been shown and described in conjunction with non return to zero (NRZ) codes, it will be seen that it is also applicable to return to zero (RZ) codes. For this purpose, the output width of the D/A converter 433 shown in FIG. 5A may be narrowed or the output signals of the AND gate 463 and 464 in FIG. 10A may be RZ-coded, by way of example. Where RZ-coding of the AND gate outputs is employed, the bipolar encoder 46 of the transmitter 40 may be constructed as shown in FIG. 13A. In FIG. 13A, an AND gate 465 performs RZ-coding of a control signal 440 shown in FIG. 13B with a control signal 466 and supplies it to AND gates 463 and 464. The control signal 440 is adapted to control the burst length. With this construction, the outputs of the AND gates 463 and 464 have a pulse duration shorter than the duration of the line clock and RZ codes are supplied to the subscriber loop 3.

Though a foregoing description has concentrated on the one-directional burst signal transmission, the present invention is also applicable to bidirectional burst signal transmission. For the latter mode of transmission, each communication apparatus will have a transmitter and a receiver combined together and connected with the loop 3 as shown in FIG. 1, while being provided with a line interface circuit adapted to isolate the transmission and reception paths from each other. An example of the line interface circuit for the case using bipolar codes is shown in FIG. 14. In FIG. 14, the first bit of a time-compressed transmit digital signal is controlled by the first bit control circuit 41 (or digital signal control circuit 45), then transformed into a line code by the bipolar encoder 46 and then given to the a loop 3 via a transformer 57. Meanwhile, bipolar codes from a remote apparatus are supplied to the reception amplifier 541 via the transformer 57. The transformer 57 functions to isolate the transmission path from the reception path while the reception amplifier 541 is controlled by a control signal 540 to interrupt its own receiving operation during transmission and thereby prevent the reception of the signal which is transmitted. The output of the amplifier 541 is given to the bipolar decoder 56 to be thereby converted into a digital signal and then decoded by the first bit-inversion control circuit 51 (or digital signal-inversion control circuit 55).

To further suppress the DC component of a burst signal, a balance bit may be added to the burst signal as described in "Time-Shaped Two-Wire Digital Subscriber Transmission System and Its Application to the Digital Telephone Set" by Nobuo Inoue et al., IEEE TRANSACTIONS ON COMMUNICATIONS, Vol. COM-29, No. 11, pp. 1565–1572, November issue, 1981. The balance bit does not have to be accompanied by any additional burst synchronization bit, preserving a proportional decrease in the burst length peculiar to the present invention.

In summary, it will be seen that the present invention well suppresses the DC component of a burst signal and shortens the burst length. This promotes the transmission of a significant amount of information even through a transmission line whose bandwidth is rather narrow, which facilitates economical use of the transmission line.

What is claimed is:

1. In a method of communication of the type comprising the steps of encoding an input digital signal given in a burst mode, representing information and having a plurality of bits including a first bit and succeeding bits each representing either a logical "0" or a logical "1", said input digital signal being encoded into a multi-level signal having a plurality of multi-level symbols including first symbol and succeeding symbols, said plurality of symbols including first polarity symbols, second polarity symbols and zero level symbols, transmitting said multi-level signal and, at a receiving end, decoding said encoded signal to obtain said information, the improvement characterized in that said encoding step comprises:

successively generating said plurality of symbols corresponding to said plurality of bits, including generating a first polarity symbol as said first symbol if said first bit represents a logical "1" and generating a second polarity symbol as said first symbol if said first bit represents a logical "0", each non-zero generated succeeding symbol having a polarity opposite the polarity of the average DC level of prior generated symbols, unless said average DC level is substantially zero in which case the polarity of a non-zero generated symbol is opposite the polarity of the most recent preceding non-zero generated symbol.

2. A method as claimed in claim 1, wherein, when said first bit represents a logical "0", said successively generating step further comprises converting said first bit to a converted bit representing a logical "1" prior to generating said second polarity symbol, and then generating as said first symbol a second polarity symbol in accordance with the information represented by said converted first bit.

3. A method as claimed in claim 1, further comprising at said receiving end the step of extracting a burst synchronization signal from said first symbol of the encoded signal.

4. A method as claimed in claim 2, wherein said decoding step at said receiving end comprises: converting each symbol of said multi-level signal into a digital signal in accordance with its absolute value to obtain a recovered digital signal having a first bit, and decoding said first bit of said recovered digital signal as a logical "1" when said first symbol is of said first polarity and decoding said first bit of said recovered digital signal as a logical "0" when said first symbol is of said second polarity.

5. A method as claimed in claim 1, wherein, when said first bit represents a logical "0", said successively generating step further comprises the step of converting each of said succeeding bits to its logical complement to obtain an inverted digital signal prior to generating said plurality of symbols, and then generating said plurality of symbols in accordance with said inverted digital signal.

6. A method as claimed in claim 1, wherein, when said first bit represents a logical "0", said successively generating step further comprises the step of converting each of said succeeding bits to its logical complement to obtain an inverted digital signal prior to generating said plurality of symbols, and then generating said plurality of symbols in accordance with said inverted digital signal; said decoding step at said receiving end comprising:

converting each multi-level symbol into a digital signal in accordance with its absolute value to obtain a recovered digital signal having a first bit and succeeding bits;

decoding said first bit of said recovered digital signal as a logical "1" when said first symbol is of a first polarity and decoding said first bit of said recovered digital signal as a logical "0" when said first symbol is of said second polarity; and inverting each of said succeeding bits of said recovered digital signal to its logical complement when said first symbol is of said second polarity.

7. A method as claimed in any one of claims 1-6, wherein each of said multi-level symbols corresponds to a plurality of said input-signal bits.

8. A method as claimed in any one of claims 1, 3 or 5, in which said multi-level symbols comprise three-level symbols which are a positive pulse, a negative pulse, and a zero level.

9. In a communications system of the type including encoding means at a transmitter for encoding an input digital signal, said input digital signal representing information and having a plurality of bits including a first bit and succeeding bits each representing either a logical "0" or a logical "1", said input digital signal being encoded into a multi-level signal having a plurality of multi-level symbols including a first symbol and succeeding symbols, said plurality of symbols including first polarity symbols, second polarity symbols and zero level symbols, transmitting means for transmitting said multi-level signal and, at a receiver, decoding means for decoding said encoded signal to obtain said information, the improvement characterized in that said encoding means comprises:

a first bit detector for detecting whether the first bit of said first input digital signal represents a logical "0" or a logical "1"; and generating means for successively generating said plurality of symbols corresponding to said plurality of bits, with each generated succeeding non-zero symbol having a polarity opposite the polarity of the average DC level of prior generated symbols, unless said average DC level is substantially zero in which case the polarity of a non-zero generated symbol is opposite the most recent preceding non-zero generated symbol, said generating means, in response to the detection by said first bit detector, generating a first polarity symbol as said first symbol if said first bit represents a logical "1" and generating a second polarity symbol as said first symbol if said first bit represents a logical "0".

10. A system as claimed in claim 9, wherein said generating means includes means for generating a symbol having an absolute value corresponding to a segment of said input digital signal including at least said first bit, and means for assigning a polarity to said absolute value in accordance with an output from said first bit detector.

11. A system as claimed in claim 10, wherein said encoding means further comprises selectable inversion means for inverting said first bit of said input digital signal to obtain an inverted first bit when said first bit of said input digital signal represents a logical "0", said absolute value generating means generating said absolute value in accordance with at least said inverted first bit.

12. A system as claimed in claim 9, wherein said receiver further comprises a first symbol extractor for extracting the polarity of said first symbol and a burst synchronization signal from said encoded signal.

13. A system as claimed in claim 11, wherein said decoding means comprises:

converting means for converting each symbol of said multi-level signal into a digital signal in accordance with its absolute value to obtain a recovered digital signal having a first bit, and decoding means for decoding said first bit of said recovered digital signal as a logical "1" when said first symbol is of said first polarity and decoding said first bit of said recovered digital signal as a logical "0" when said first symbol is of said second polarity.

14. A system as claimed in claim 13, wherein said selectable inversion means converts each of said succeeding bits to its logical complement when said first bit of said input digital signal represents a logical "0", to thereby obtain an inverted digital signal, said absolute value generating means generating said absolute values in accordance with said inverted digital signal.

15. A system as claimed in claim 14, wherein said decoding means comprises:

converting means for converting each multi-level symbol into a digital signal in accordance with its absolute value to obtain a recovered digital signal having a first bit and succeeding bits;

decoding means for decoding said first bit of said recovered digital signal as a logical "1" when said first symbol is of a first polarity and decoding said first bit of said recovered digital input as a logical "0" when said first symbol is of said second polarity; and means for inverting each of said succeeding bits of said recovered digital signal to its logical complement when said first symbol is of said second polarity.

16. A system as claimed in any one of claims 9-15, wherein each of said multi-level symbols generated by said generating means corresponds to a plurality of said input signal bits.

17. A system as claimed in any one of claims 9, 10 or 12, in which said multi-level encoder comprises a bipolar encoder for three-level codes which are a positive pulse, a negative pulse, and a zero level, while the multi-level decoder comprises a bipolar decoder.

* * * * *

UNITED STATES PATENT AND TRADEMARK OFFICE
CERTIFICATE OF CORRECTION

PATENT NO. : 4,464,765

DATED : Aug. 7, 1984

INVENTOR(S) : Hiroshi SHIMIZU

It is certified that error appears in the above-identified patent and that said Letters Patent is hereby corrected as shown below:

Column 1, line 12, change "system" to --systems--;

line 13, "speed-data" should be --speech-data--.

Column 2, line 45, "local" should be --logical--;

line 55, before "extracted", insert --at a receiving end, a burst synchronization signal is--;

line 62, delete the second "a";

line 64, delete "a".

Column 5, line 5, "1" should be --"-1"--.

Column 6, line 8, "transformer" should be --transformed--.

line 44, after "as" delete "the";

line 49, after "receiver" insert --is designed--.

Column 7, line 2, after "inversion", delete "it";

line 36, "as" should be --is--.

UNITED STATES PATENT AND TRADEMARK OFFICE
CERTIFICATE OF CORRECTION

PATENT NO. : 4,464,765

DATED : Aug. 7, 1984

INVENTOR(S) : Hiroshi SHIMIZU

It is certified that error appears in the above-identified patent and that said Letters Patent is hereby corrected as shown below:

Column 8, line 16, "diabled" should be --disabled--.

Column 10, line 6, "gate" should be --gates--;

line 19, "a" should be --the--;

line 20, "the" (first occurrence) should be --a--;

line 33, delete "a" before "loop";

line 41, "is" should be --it--.

Column 11, line 4, before "first", insert --a--.

Column 12, line 9, "input-signal" should be --input signal--.

Signed and Sealed this

Fourth Day of June 1985

[SEAL]

*Attest:*

DONALD J. QUIGG

*Attesting Officer*    *Acting Commissioner of Patents and Trademarks*